Oct. 4, 1955     C. C. S. LE CLAIR     2,719,603
GREASE INJECTOR

Filed Oct. 1, 1952     3 Sheets-Sheet 1

Inventor:
Camille Clare Sprankling Le Clair
By Ahlberg, Kupper, & Gradolph
Attorneys.

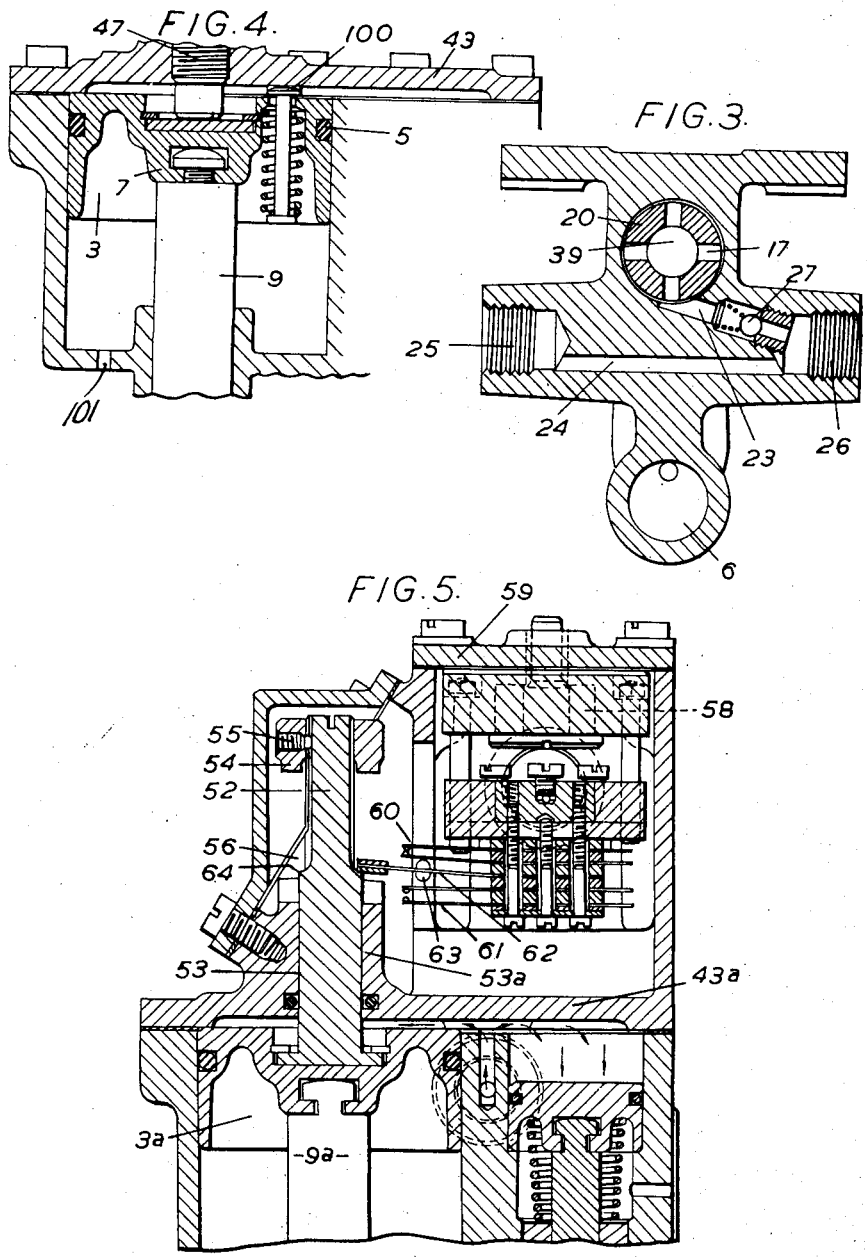

Oct. 4, 1955   C. C. S. LE CLAIR   2,719,603
GREASE INJECTOR
Filed Oct. 1, 1952   3 Sheets-Sheet 3

Inventor:
Camille Clare Sprankling Le Clair
By Ahlberg, Hupper & Tradolph
Attorneys

United States Patent Office 2,719,603
Patented Oct. 4, 1955

2,719,603
GREASE INJECTOR

Camille Clare Sprankling Le Clair, East Toronto, Ontario, Canada, assignor to Tecalemit Limited, Brentford, England Application October 1, 1952, Serial No. 312,588

12 Claims. (Cl. 184—7)

This invention relates to lubricant-distributing systems for use on vehicles and machines, of the kind comprising at least one injector including a pressure-fluid operated lubricant-discharge piston which forces the lubricant to a bearing or other place of use.

The injector is adapted to pump grease or oil, but hereinafter both grease and oil will be referred to as "grease." The injector may also be operated by pressure-liquid, gas or air but hereinafter liquid, gas, or air will be referred to as "air" or "compressed air."

According to the present invention the injector comprises a compressed-air operated grease-discharge piston and a compressed-air operated control valve, which is adapted to control the inlet of grease to, and the discharge of grease from, the cylinder of the grease-discharge piston, the grease being fed into the cylinder at constant pressure from a source of supply. The arrangement is such that when the control valve is in one operative position grease is fed into the grease-discharge cylinder and the grease-discharge piston carries out its charge stroke during which the cylinder is charged, whereas when the valve is in its second operative position, the grease is discharged from the cylinder into the bearing or other place of use.

Time-controlled means may be provided for controlling the supply of compressed air to, and the discharge of the air from, the injector.

In one constructional form of the invention one end of the grease-discharge piston is connected to a piston slidable in a cylinder which is parallel to, but spaced from, a cylinder in which a piston, connected to a control valve is slidable. The two cylinders are permanently connected at one end so that the compressed air will be admitted to both simultaneously. The control valve operates in conjunction with grease-inlet ports and passages, grease-transfer ports and passages, which are connected to the grease-discharge cylinder and through which the grease is fed into the cylinder on the charge stroke of the piston, and grease-discharge ports and passages through which, on the discharge stroke of the piston, the grease, after passing through the transfer ports, and passages, is discharged from the injector.

Means are preferably provided for varying the stroke of the grease-discharge piston and such means may consist of an axially-adjustable member which is separate from the piston and one end of which acts as a stop to limit the charge stroke of the piston. In a modification the adjustable member moves in company with the grease-discharge piston.

In a modified constructional form of the invention means are provided for indicating when the grease-discharge piston fails to complete its charge and discharge strokes. Such means may include normally-energised electro-magnets, one of which is short-circuited when the grease-discharge piston fully completes its discharge stroke while the other is short-circuited when the piston fully completes the charge stroke. Each electro-magnet is associated with a set of contacts which are closed by means associated with the piston if the piston fully completes its charge or discharge stroke as the case may be. In order to give warning of the failure of an injector to carry out properly its charge and discharge strokes visual and (or) audible warning devices may be included in the electric circuit.

In another construction for use in an arrangement in which more than one injector is used, the movements of each grease-discharge piston are arranged to operate counter-mechanism, so that by comparing the number of "shots" or discharges of grease from the injectors an attendant can trace which of the injectors is not operating correctly.

Advantages of the invention are that, as the grease pressure in the supply line is constant, complicated control valves are not required at the supply points and the delivery pressure of the grease to the places of use is independent of, and not related to, the grease supply pressure.

Three constructional forms of the invention are shown, by way of example, in the accompanying sheets of drawings, wherein:

Fig. 1 is a sectional elevation of one injector unit which comprises an air-operated grease discharge piston, and an air-operated control valve, and in which the means for adjusting the stroke of the grease discharge piston consists of an adjustment screw which is adjustably mounted in a threaded hole in the common cover of the cylinders for the air-operated pistons of the grease-discharge piston and the control valve;

Fig. 3 is a section on the line A—A in Fig. 1;

Fig. 4 is a fragmentary section of a modified construction of the air-operated piston of the grease-discharge piston;

Fig. 5 is a sectional elevation of a modified injector unit;

Figure 1:
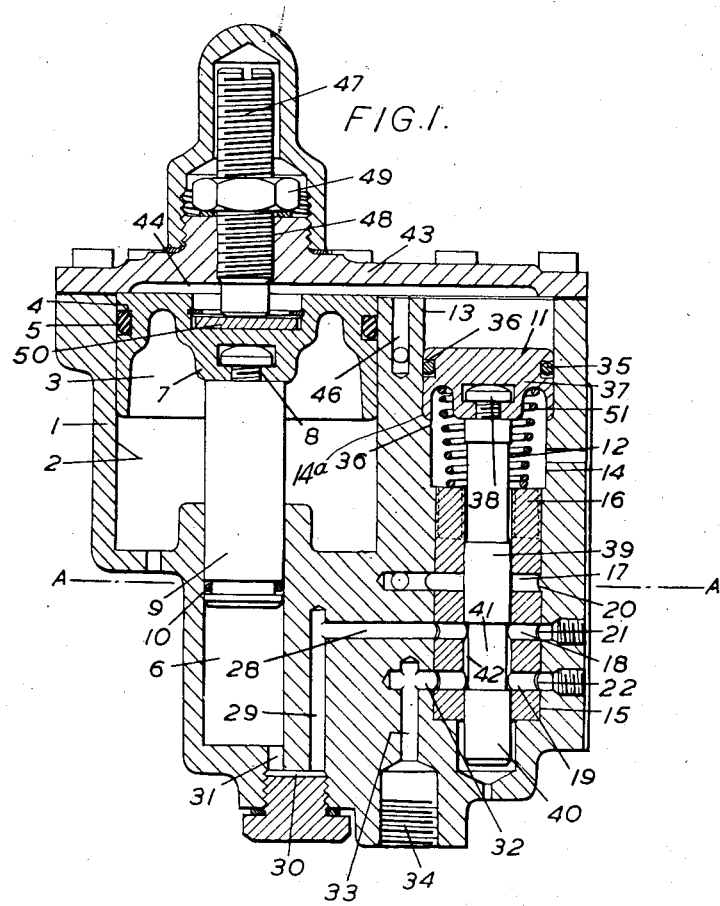
Figure 2:
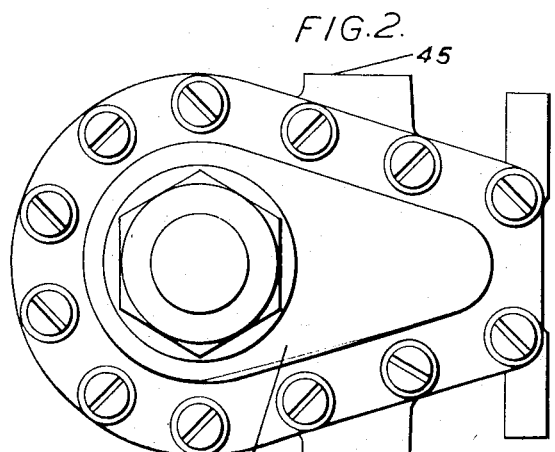
Fig. 2 is a top plan view of the injector unit.

Referring first to Figs. 1 to 3:

In the constructional form of the invention shown in these figures, the injector comprises a body 1 which is bored to form a cylinder 2 for an air-operated piston 3, the skirt of which is formed with an annular recess 4 in which a ring-type packing 5 is fitted. The cylinder is coaxial with a grease-discharge cylinder 6 the diameter of which is less than that of the cylinder of the air-operated piston 3. A boss 7 extends downwardly from the crown of the air-operated piston and it is formed with a keyhole slot 8 into which the appropriately-shaped upper end of the grease discharge piston 9 is fitted, the arrangement being such that the necessity for accurate aligning of the air-cylinder 2 and the grease discharge cylinder 6 is obviated. Leakage of grease between the grease-discharge cylinder and the grease-discharge piston is prevented by a ring-type packing 10 fitted in an annular recess in the piston.

The air-operated piston 11 of a piston-type control valve 12 is slidably arranged in a bore 13 which is parallel to, but offset to one side from, the air-cylinder 2 and the grease-discharge cylinder 6, this bore extending over a part only of the depth of the body where it communicates with a coaxial intermediate bore 14 of less diameter. The lower end of the intermediate bore communicates with a coaxial bottom bore 15 and a liner 16 is press-fitted into the bottom bore. The liner is formed with three longitudinally-spaced sets of radial ports 17, 18 and 19, which communicate respectively with annular recesses 20, 21 and 22 provided around the liner. The uppermost annular space 20 communicates with one end of a grease-inlet port 23 formed in the body, the opposite end of the port communicating with a grease-inlet, straight-through passage 24 the two ends of which communicate with enlarged inlets 25 and 26, which are screw-threaded to receive unions (not shown) by means of which a number of injectors may be connected by pipe lines connected to a source of grease under pressure. A spring-urged non-return valve 27 is fitted between the said port and the inlet passage.

The central annular space 21 is connected by transverse and longitudinal passages 28 and 29 in the body to a grease inlet chamber 30 which is connected by a port 31 to the lower end of the grease-discharge cylinder 6.

The lowermost annular space 22 is connected by passages 32 and 33 in the body to a grease outlet 34 which is screw-threaded to receive a union (not shown) by means of which the outlet may be connected by a pipe to a bearing or other place of use of the grease. A packing ring 35 is fitted in an annular recess 36a formed in the air-operated control valve piston 11, which latter is formed with a boss 36 provided with a keyhole slot 37 into which the appropriately-shaped upper end 38 of the valve is detachably fitted. The piston valve is formed with a central part 39 which is a sliding fit in the liner 16 and a lower part 40 which is also slidable in the liner, the two parts being separated by a part 41 of less diameter so that an annular transfer space 42 is formed between the two parts and the bore of the liner. The open upper ends of the cylinders in which the two air-operated pistons 3 and 11 are slidable are closed by a cover 43 which is recessed on its underside to provide an air inlet chamber 44 above the two cylinder bores which is supplied with air from a source of compressed air through passages 45 and an air inlet 46 formed in the injector body.

The upward (or charge) stroke of the air-operated piston 3 connected to the grease-discharge piston 9 is limited by an adjustable stop 47 which, in this construction, consists of a screw which is screwed through a threaded hole 48 formed in the cover 43 coaxially with the grease-discharge piston and its air-operated piston. The adjustment stop projects downwards into the cylinder 2 of the air-operated piston 3 and upwards externally of the top of the cover 43. The stop may be locked in its various adjusted positions by a locknut 49. A hardened disc 50 is fitted in a recess formed in the top of the air-operated piston of the grease-discharge piston and is adapted to take up the thrust exerted upon the adjustment screw 47 by the air-operated piston on the upstroke or charge stroke of the grease-discharge piston.

A coil spring 51, which reacts between the top face of the liner 16 and the underside of the air-operated valve 12, tends constantly to thrust the latter and its associated air-operated piston 11 upwards.

When the injector is at rest the grease-discharge piston 9 and its air-operated piston 3 are both at the bottoms of their down (or discharge) strokes, while the control valve 12 and its associated piston 11 are both at the top of their upstrokes due to the expansion of the coil spring 51 acting upon them. In these positions of the two pistons, through the uppermost annular space 20 in the liner 16 surrounding the control valve the uppermost ports 17 and the central ports 18 in the liner are in communication. When pressure-grease is supplied to the grease line, therefore, it passes from the longitudinal grease-inlet passage and past the non-return valve 27 into the grease-inlet port 23, the radial ports 17 and into the annular space 42. From the annular space 42 the grease passes into the central set of radial ports 18 in the liner, into the outlet passages 28 and 29 in the body and through the outlet chamber 30 and the port 31 into the cylinder 6 of the grease-discharge piston 9. In these circumstances, the grease-discharge piston is forced upwards in its cylinder until the upward movement is stopped by the contact of the hardened disc 50 in the air-operated piston 3 of the grease-discharge piston with the inner end of the adjustment screw 47, the grease-discharge cylinder then being fully charged.

If compressed air is now admitted to the air inlet chamber 44 above the two air-operated pistons it exerts pressure on both pistons. The control valve and its associated piston 11 are forced downwards against the opposing action of the coil spring 12 until their movement is stopped by the engagement of the air-operated piston with the shoulder 14a formed at the junction of the upper and intermediate bores 13 and 14. Until the air-operated piston reaches this position, however, the grease-discharge piston 9 cannot move downwards since it is held against such movement by the pressure of the grease previously fed into its cylinder 6 and acting in opposition to such movement.

When the control valve has reached its lowermost position, the annular space 42 between the valve and the bore of the liner establishes communication between the central set of radial ports 18 in the liner and the lowermost set of ports 32. In this position of the valve, therefore, the cylinder space 6 below the grease-discharge piston 9, is put into communication with the grease-discharge passages 32, 33 and the grease outlet 34 from the body through the grease-inlet passages 28, 29 leading to the cylinder space from the central set of radial ports 18, the annular space and the lowermost set of radial ports 19. The pressure of the air acting upon the piston 3 associated with the grease-discharge piston 9 forces the two pistons 9 and 3 downwards on the discharge stroke and grease is forced from the grease-discharge cylinder 6.

It will be appreciated that the quantity of grease received by the grease-discharge cylinder and discharged therefrom may be varied by adjusting the position of the adjustment screw 47 axially.

After the completion of a discharge stroke the air in the chamber 44 above the two air-operated pistons 3 and 11 is allowed to escape by venting the whole air supply line to atmosphere, which allows the piston 11 to rise under the action of its spring 51, followed by the piston 3 under the pressure of the grease on the piston 9.

Figure 4 shows a modified form of construction which is particularly intended for use when a long air line is necessary and which is provided with means for speeding the exhaustion of air from the chamber 44 above the pistons 3 and 11.

This means takes the form of a spring-urged non-return valve 100 which is provided in the crown of the piston 3 and the lower end of the stem of which is arranged to strike the bottom of the air cylinder to open the valve as the piston 3 reaches the bottom of its stroke. This allows the chamber 44 above the piston 3 to vent itself through the outlet 101 at the bottom of the cylinder at the same time as the air line is itself opened to the atmosphere.

In a lubricant-distribution system as used for example, on a vehicle or on machinery the grease inlets of a number of injectors and the air inlets of the injectors are connected in series respectively, to grease and air supply sources by common grease and air lines. The grease may be supplied to the grease line under constant pressure by an air-operated pump and the compressed air may be supplied to the air line by a compressor associated with a time-controlled valve, the timing being electrically, electronically or mechanically controlled, so that the air may be delivered intermittently as predetermined by the timing control. Thus, each time the control valve is opened grease will be delivered to a bearing or other place of use from each injector and each time the valve is closed the air supply will be vented to atmosphere and the control valves and their associated pistons will return to their rest positions in readiness for the succeeding cycle of operation.

Figure 7:
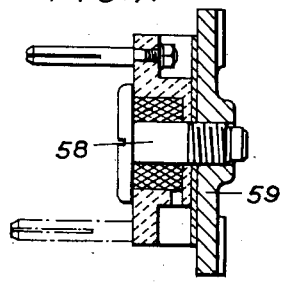
Fig. 7 is a section on the line B—B in Fig. 6.
Figure 6:
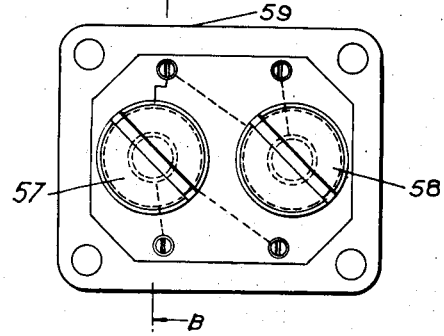
Fig. 6 is an inverted plan view of the terminal box cover of the injector unit shown in Fig. 5.

The modified constructional form of the invention shown in Figs. 5 to 7 is constructed like the injector described above, except in the following respects. The abutment screw 47 is replaced by a cylindrical abutment rod 52 the lower end of which is detachably fixed to the air-operated piston 3a associated with the grease-discharge piston 9a. The lower part of the adjustment rod is slidably guided in a bearing 53 formed in a boss 53a projecting upwards from the cover 43a, which latter in this construction forms the base of a casing. The upper part of the abutment rod 52 is threaded to receive a threaded abutment collar 54 which is provided with a screw 55 whereby it may be locked in various adjusted positions upon the rod. The part of the casing within which the adjustment rod is located is provided with a detachable, transparent cover 56 through which the movement of the rod may be observed.

Within the casing to one side of the adjustment rod 52 there are two spaced electro-magnets 57 and 58 which are carried on the underside of a cover 59 closing the open upper end of the casing and are normally energised by an electro-supply circuit. Two pairs of contacts 60 and 61 each comprising a fixed contact arm and a flexible contact arm, are associated with each electro-magnet and between the two flexible arms there is a movable contact arm 62 carrying an abutment 63, which, between the extreme positions of the piston 9a, is clear of the two flexible arms. If the grease-discharge piston 9a fully completes its upward or charge stroke the outer end of the movable arm 62 is struck by the shoulder 64 between the threaded part and the plain cylindrical part of the adjustment rod 52, the upper pair of contacts 60 is closed and one of the electro-magnets is circuited. Similarly, if the grease-discharge piston fully completes its discharge stroke the adjustable abutment collar 54 strikes the outer end of the movable arm, the lower pair of contacts 61 is closed and the other electro-magnet is short-circuited. Thus, failure of the grease-discharge piston 9a to complete its charge stroke or its discharge stroke results in one of the electro-magnets remaining energised and the failure to close either pair of contacts may be indicated at the control position of the system by a coloured light and (or) by an audible warning such as a bell, hooter and buzzer.

When a fault has been indicated an attendant could readily locate that injector which is not operating properly by touching the exposed cores of the electro-magnets with a steel object.

The quantity of grease charged into and discharged from the grease-discharge cylinder may be varied by adjusting the position of the collar 54 on the adjustment rod 52.

Figure 8:
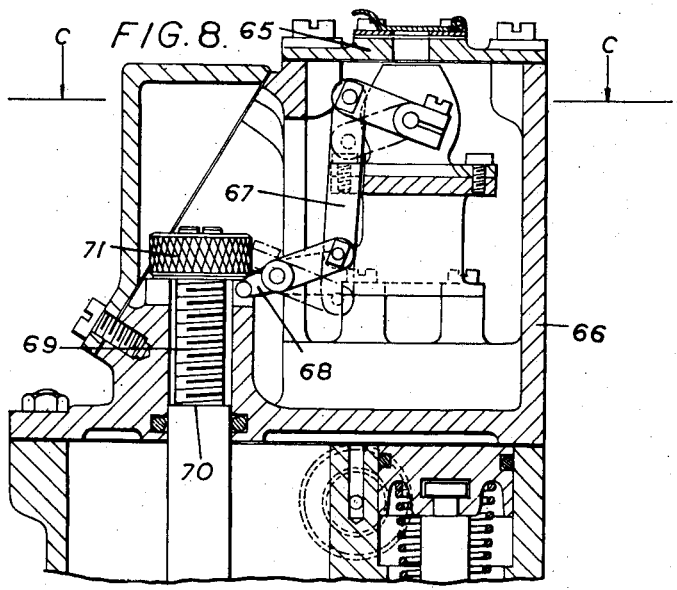
Fig. 8 is a sectional view of another modification of the injector unit shown in Figs. 1 to 4.
Figure 9:
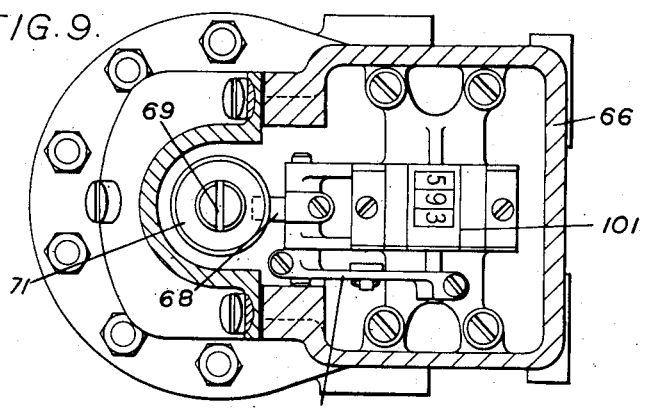
Fig. 9 is a section on the line C—C in Fig. 8.

The third constructional form of the invention shown in Figs. 8 and 9 is also constructed like the modified injector described above except in the following respects.

A counter mechanism 101 of known construction is carried by the top cover 65 of the casing 66 and is operated by linkage mechanism 67 with which one end of a pivoted arm 68 is connected. The opposite end of the arm lies in the path of movement of the adjustment rod 69 and is struck and rocked by the shoulder 70 between the threaded and plain cylindrical parts of the rod if the grease-discharge piston fully completes its charge stroke and by the adjustment collar 71 on the rod when the piston fully completes its discharge stroke. Thus, by means of the counter mechanism an attendant can check the number of "shots" or discharges of grease each injector has made and a difference in the indicated numbers would indicate the failure of an injector to operate properly.

It will be understood that the adjustment screw 47 in the constructional form shown in Figs. 1 to 4 may be replaced by the adjustment rod and collar as included in the modified constructions shown in Figs. 5 to 7 and Figs. 8 and 9.

I claim:

1. A grease injector comprising a body having a grease inlet and a grease outlet, and having first and second cylinders, a compressed air-operated piston slideable in said first cylinder, a grease discharge piston slideable in said second cylinder, said cylinders being isolated from each other and said pistons being connected, a third cylinder in said body, a second compressed air-operated spring-returned piston slideable in said third cylinder, and a control valve connected to said grease inlet and said grease outlet and having a passage extended to said second cylinder, said control valve having a valve member connected to said second compressed air-operated piston for operation thereby, said control valve being adapted in one operative position to connect said grease inlet with said passage and in a second operative position to connect said passage with said grease outlet, whereby to control the inlet of grease to and the discharge of grease from said second cylinder, said first and third cylinders being permanently connected at one end so that compressed air can be admitted to both said first and third cylinders simultaneously, the arrangement being such that when the control valve is in said one operative position, grease under pressure may feed into said second cylinder, and the grease discharge piston carries out its charge stroke during which said second cylinder is charged whereas when the control valve is in said second operative position, the grease is discharged from the said second cylinder and through said grease outlet.

2. A grease injector comprising a body having first and second cyinders, a compressed air-operated piston slideable in said first cylinder, a grease discharge piston slideable in said second cylinder, said cylinders being isolated from each other and said pistons being connected, a third cylinder in said body, a second compressed air-operated piston slideable in said third cylinder, a control valve connected to said second compressed air-operated piston, said body having a grease inlet and a grease outlet communicating with said valve and also having a passage from said second cylinder to said valve, said control valve being adapted in a first operative position to connect said grease inlet with said passage and in a second operative position to connect said passage with said grease outlet whereby to control the inlet of grease to and the discharge of grease from said second cylinder, and resilient means urging said control valve to said first operative position, said first and third cylinders being permanently connected at one end so that compressed air can be admitted to both said first and third cylinders simultaneously, the arrangement being such that when the control valve is in said first operative position, grease under pressure may feed into said second cylinder and the grease discharge piston carries out its charge stroke during which said second cylinder is charged whereas when the control valve is in said second operative position, the grease is discharged from the said second cylinder through said grease outlet.

3. A grease injector comprising a body having first and second cylinders, a compressed air-operated piston slideable in said first cylinder, a grease discharge piston slideable in said second cylinder, said cylinders being isolated from each other and said pistons being connected, a third cylinder in said body spaced laterally from and parallel to said second cylinder, a second compressed air-operated piston slideable in said third cylinder, a control valve connected to said second compressed air-operated piston, said body having a grease inlet and a grease outlet communicating with said valve and also having a passage from said second cylinder to said valve, said control valve being adapted in a first operative position to connect said grease inlet with said passage and in a second operative position to connect said passage with said grease outlet whereby to control the inlet of grease to and the discharge of grease from said second cylinder, and resilient means urging said control valve to a first operative position, said first and third cylinders being permanently connected at one end so that compressed air can be admitted to both said first and third cylinders simultaneously, the arrange-ment being such that when the control valve is in said first operative position, grease under pressure may feed into said second cylinder and the grease discharge piston carries out its charge stroke during which said second cylinder is charged whereas when the control valve is in its second operative position, the grease is discharged from the said second cylinder through said grease outlet.

4. A grease injector comprising a body having first and second cylinders, a compressed air-operated piston slideable in said first cylinder, a grease discharge piston slideable in said second cylinder, said cylinders being isolated from each other and said pistons being connected, a third cylinder in said body spaced laterally from and parallel to said second cylinder, a second compressed air-operated piston slideable in said third cylinder, a cylindrical liner in said body, a cylindrical slide type control valve slideable in said liner, said control valve being connected to said second compressed air operated piston, said body having a grease inlet and a grease outlet communicating with said valve and also having a passage from said second cylinder to said valve, said control valve being adapted in a first operative position to connect said grease inlet with said passage and in a second operative position to connect said passage with said grease outlet whereby to control the inlet of grease to and the discharge of grease from said second cylinder, and resilient means urging said control valve to said first operative position, said first and third cylinders being permanently connected at one end so that compressed air can be admitted to both said first and third cylinders simultaneously, the arrangement being such that when the control valve is in said first operative position, grease under pressure may feed into said second cylinder and the grease discharge piston carries out its charge stroke during which said second cylinder is charged whereas when the control valve is in its second operative position, the grease is discharged from the said second cylinder through said grease outlet.

5. A grease injector comprising a body having first and second co-axial cylinders, a compressed air-operated piston slideable in said first cylinder, a grease discharge piston slideable in said second cylinder, said cylinders being isolated from each other and said pistons being connected, a third cylinder in said body spaced laterally from and parallel to said co-axial cylinders, a second compressed air-operated piston slideable in said third cylinder, a cylindrical liner mounted in said body, a cylindrical slide type control valve slideable in said liner, said control valve being connected to said second compressed air operated piston, said body having a grease inlet and a grease outlet communicating with said valve and also having a passage from said second cylinder to said valve, said control valve being adapted in a first operative position to connect said grease inlet with said passage and in a second operative position to connect said passage with said grease outlet whereby to control the inlet of grease to and the discharge of grease from said second cylinder, and resilient means urging said control valve to said first operative position, said first and third cylinders being permanently connected at one end so that compressed air can be admitted to both said first and third cylinders simultaneously, the arrangement being such that when the control valve is in said first operative position, grease under pressure may feed into said second cylinder and the grease discharge piston carries out its charge stroke during which said second cylinder is charged whereas when the control valve is in said second operative position, the grease is discharged from the said second cylinder through said grease outlet.

6. An injector as claimed in claim 2 wherein means are provided for adjusting the stroke of the grease discharge piston.

7. An injector as claimed in claim 6 wherein the said means consist of an axially adjustable member which is separate from the grease discharge piston and one end of which acts as a stop to limit the charge stroke of the grease discharge piston.

8. An injector as claimed in claim 6, wherein the adjustment member moves in company with the grease discharge piston.

9. An injector as claimed in claim 6, wherein means are provided for indicating when the grease discharge piston fails to complete its charge and discharge strokes.

10. An injector as claimed in claim 9 wherein the said means include normally energized electromagnets, one of which is short circuited when the grease discharge piston fully completes its discharge stroke while the other is short circuited when the piston fully completes the charge stroke, each electromagnet being associated with a set of contacts which are closed by means associated with the piston if the piston fully completes its charge stroke or discharge stroke as the case may be.

11. An injector as claimed in claim 6, wherein the grease discharge piston in its movements is arranged to operate a counter mechanism.

12. An injector as claimed in claim 2 wherein the air-operated piston connected to the grease discharge piston is provided with a spring-urged non-return air valve which is opened automatically as the piston reaches the limit of the grease discharge stroke to allow the discharge of pressure air from the corresponding cylinder.

References Cited in the file of this patent

UNITED STATES PATENTS

| | | |
|---|---|---|
| 804,384 | Cole | Nov. 14, 1905 |
| 1,698,159 | Goddard | Jan. 8, 1929 |
| 1,931,894 | Gill | Oct. 24, 1932 |
| 2,197,705 | Nemetz | Apr. 16, 1940 |